United States Patent
Mattes et al.

(10) Patent No.: US 7,260,460 B2
(45) Date of Patent: Aug. 21, 2007

(54) DEVICE FOR IDENTIFYING THE RISK OF A ROLLOVER

(75) Inventors: Bernhard Mattes, Sachsenheim (DE); Thomas Herrmann, Oehringen (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 10/503,431

(22) PCT Filed: Sep. 23, 2002

(86) PCT No.: PCT/DE02/03568

§ 371 (c)(1),
(2), (4) Date: Apr. 13, 2005

(87) PCT Pub. No.: WO03/064216

PCT Pub. Date: Aug. 7, 2003

(65) Prior Publication Data

US 2005/0168575 A1    Aug. 4, 2005

(30) Foreign Application Priority Data

Feb. 1, 2002    (DE)    ................. 102 04 128

(51) Int. Cl.
*B60R 21/01*    (2006.01)

(52) U.S. Cl. ...................................... 701/45; 348/148
(58) Field of Classification Search ..................... None
See application file for complete search history.

(56) References Cited

U.S. PATENT DOCUMENTS

| | | |
|---|---|---|
| 6,259,999 B1 | 7/2001 | Pantle |
| 6,687,576 B2 | 2/2004 | Mattes et al. |
| 2003/0021445 A1 | 1/2003 | Larice et al. |

FOREIGN PATENT DOCUMENTS

| | | |
|---|---|---|
| DE | 198 22 184 | 11/1999 |
| DE | 199 62 491 | 7/2001 |
| WO | WO99/05004 | 2/1999 |
| WO | WO 01/79036 | 10/2001 |

*Primary Examiner*—Michael J Zanelli
(74) *Attorney, Agent, or Firm*—Kenyon & Kenyon LLP

(57) ABSTRACT

A device for detecting rollover includes a stereo camera in the direction of travel. The camera allows the distance to an object outside the vehicle to be measured, and, in each instance, image vectors to this object are calculated. If the vertical component of these image vectors now changes over time, then a rollover event is detected as a function of this change.

7 Claims, 1 Drawing Sheet

DEVICE FOR IDENTIFYING THE RISK OF A ROLLOVER

FIELD OF THE INVENTION

The present invention relates to a device for detecting rollover.

SUMMARY

A device according to an example embodiment of the present invention for detecting rollover may provide that, with the aid of a stereo camera, the rollover detection even functions in the event of a rollover in the air, and that a camera for a different purpose, such as for night vision, traffic-sign detection, a lane-exiting warning device, roadway-course detection and/or precrash sensing, etc., may additionally be used to detect rollover. A stereo camera may provide for determination of the distance to an object to be conducted, using triangulation.

The stereo camera may be set up (oriented) in the direction of travel, and the processor then detects a rollover event, e.g., one about the transverse axis of the vehicle, as a function of the change in the vertical components of an image vector over time. This transverse vehicle axis or y axis or also pitch axis is generally not yet monitored. In a rollover event about the transverse vehicle axis, the vertical components of the two image vectors change substantially in parallel, while, in a rollover event about the longitudinal vehicle axis, the vertical components change differently.

In addition, the processor connected to the stereo camera may calculate the temporal change in the vertical components of the image vectors from sampling point to sampling point. In this case, a sampling rate of approximately 40 ms may be used. Such a sampling rate is sufficiently rapid for rollover events, which are relatively slow.

Furthermore, the processor may determine the roll velocity and/or the roll angle from the temporal change in the vertical components. The values relevant to a rollover event are between a minimum of a 10° roll angle in 500 ms and a maximum of a little more than a 10° roll angle in 40 ms.

Exemplary embodiments of the present invention are illustrated in the appended Figures and explained in the following description.

DETAILED DESCRIPTION

Figure 1:
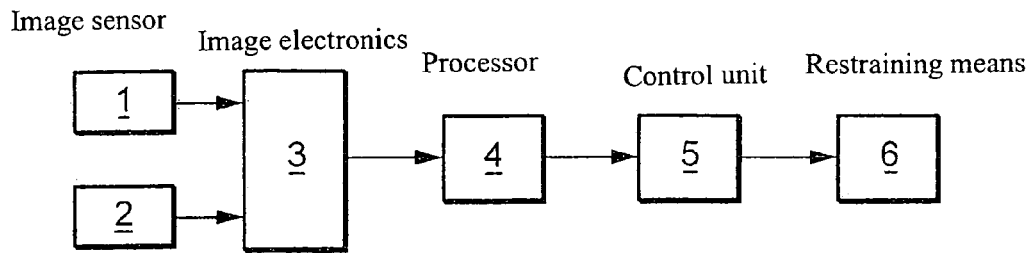
FIG. 1 illustrates a block diagram of a device according to an example embodiment of the present invention.

Rollover events are understood to be the overturning of a vehicle about its longitudinal axis or its transverse axis. The longitudinal axis is also referred to as the roll axis, while the transverse axis is also referred to as the pitch axis.

Rollover situations are generally detected by inertial and gravitational sensors, i.e., by x-rotation-rate sensors and y and z, low-g acceleration-plausibility sensors, or only by simpler, mechanical sensors, which function according to the principal of a pendulum prestressed by a magnetic force. If one also wants to detect pitchover situations, then an additional y-rotation-rate sensor and an x-low-g acceleration sensor may be necessary. Rollover events occur in approximately 23% of accidents and result in approximately 6% of the fatal injuries to vehicle occupants.

When a vehicle rolls over in the air, i.e., after all of the wheels lose contact with the ground (airborne rollover), a plausibility check by the low-g acceleration plausibility sensors may be physically faulty, due to the lack of gravitation. However, this is accepted, since the rotation-rate sensors measuring the Coriolis force also function correctly in the air. However, mechanical sensors only function for as long as the vehicle is in contact with the ground. The device hereof may allow a rollover to be detected in a manner equally independent of ground contact, with the aid of a stereo camera including two image sensors. Such a stereo video camera, which looks outwards, may, for example, already be present in a vehicle for night vision, traffic-sign detection, a lane-exiting warning device, roadway-course detection, an object classification system, etc., and a relative distance, speed, and precrash sensory system. Such a camera may additionally be used for detecting rollover, as well.

The stereo camera measures distances from approximately 4 m to 40 m, using so-called triangulation. Triangulation describes a method of dividing up a region into smaller regions, namely triangles, which are interconnected. A distance may then be measured by determining angles. The stereo camera has an opening angle in the vertical direction of approximately 17° and a sampling rate of 40 ms. The stereo camera includes two image sensors, which are synchronously evaluated, an image vector being determined, for example, for an object 20 m away. The vectorial change between the individual images is used for determining the rollover event, for if the vertical components of the image vectors of the two image sensors change too much for the same sampling points from one sampling occurrence to the next, then a rollover event is occurring. A threshold-value comparison occurs in accordance with this. The threshold-value comparison of the change of the vertical component of an image vector from an image sensor may already be used for detecting a rollover event, as well. In addition, one may derive rotation information from the image vectors and calculate the roll velocity and the accumulated roll angle from it. The values relevant to a rollover event are between a minimum of a 10° roll angle in 500 ms and a maximum of a roll angle $\geq 10°$ in 40 ms.

FIG. 1 shows a device of an example embodiment of the present invention as a block diagram. Image sensors 1 and 2 are connected to electronics 3, which amplify and digitize the image-sensor signals and, in some instances, perform a pre-evaluation. Together, image sensors 1 and 2 and electronics 3 form the stereo camera. CMOS cameras may be used as image sensors 1 and 2, but other cameras may also be used here, for example, infrared cameras. Each image sensor may also include its own electronics. Electronics 3 are connected to a processor. This connection may be made via a two-wire line, via a radio link, or, as in this case, via a bus. Processor 4 performs the evaluation of the image-sensor signals and determines the image vector and the change in the image vectors as a function of time. From this, the processor then determines if a rollover event is occurring, and if yes, it determines the roll velocity and the accumulated roll angle. If processor 4 has detected such a rollover event, then processor 4 transmits this information to a control unit 5 for a restraining arrangement, via either a two-wire line or a bus, so that control unit 5 may trigger restraining arrangement 6 as a function of this rollover event and, if indicated, other sensor values. Such restraining arrangement 6 are to be understood as including belt tensioners and airbags.

Figure 2:
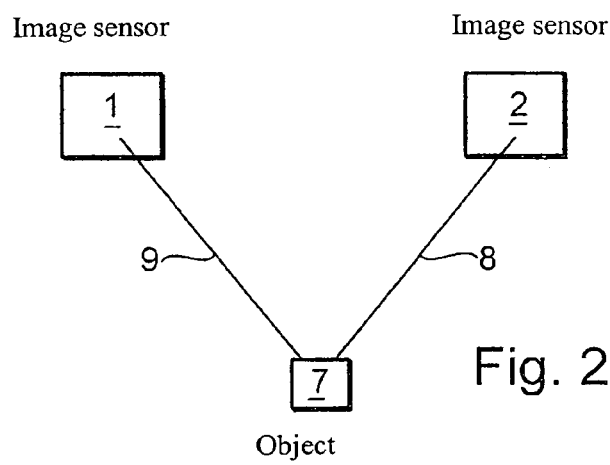
FIG. 2 illustrates object monitoring by the image sensors.

FIG. 2 shows how image sensors 1 and 2 detect an object 7. Vectors 9 and 8 from image sensors 1 and 2, respectively, to object 7 are calculated by processor 4. If the vertical components, i.e., the z-direction components, of these vectors 9 and 8 change differently, then a rollover event may be assumed, since, in the case of a rollover event about the longitudinal vehicle axis, the z component will change sharply. In a rollover event about the transverse vehicle axis, the z components of the two image vectors change in parallel, and in a substantially identical manner.

Figure 3:
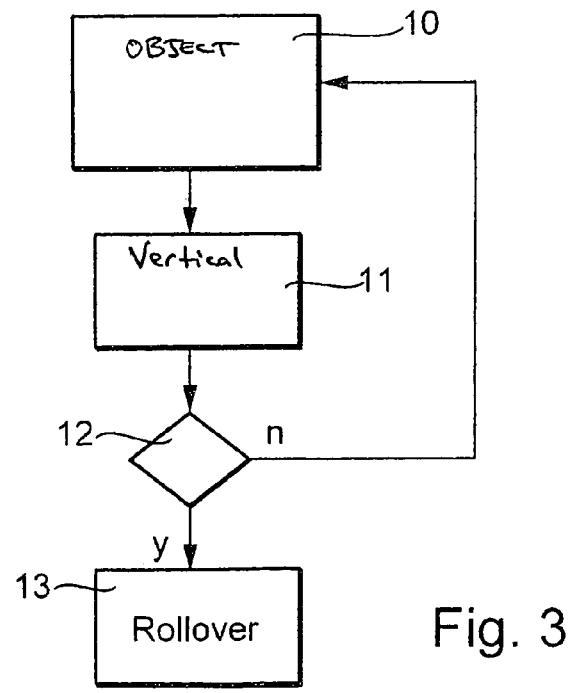
FIG. 3 illustrates a flowchart, which represents the functional sequence on a processor of a device according to an example embodiment of the present invention.

FIG. 3 shows a flowchart of the method, which is implemented on processor 4. In method step 10, an object is identified with the aid of image sensors 1 and 2 and electronics 3, and processor 4 calculates vectors 9 and 8 to this object 7. In method step 11, processor 4 determines the vertical component and either compares it directly to a threshold value or compares it to the previous vertical segment and then compares the difference between these to a specified threshold value. In method step 12, it is then checked whether or not the threshold value was exceeded. If this is not the case, then the method returns to method step 10, and, if this is the case, then the rollover is detected in method step 13, and this is communicated to control unit 5.

What is claimed is:

1. A device for detecting rollover of a vehicle, comprising:
    a stereo camera including two image sensors, the stereo camera configured to conduct a distance measurement to an object and to generate image vectors for each image sensor; and
    a processor connected to the stereo camera, the processor configured to detect a rollover event from a change in vertical components of the image vectors over time.

2. The device of claim 1, wherein the stereo camera is oriented in a direction of travel, the processor configured to detect the rollover event about a longitudinal vehicle axis as a function of a different change in the vertical components over time.

3. The device of claim 1, wherein the processor is configured to detect the rollover event about a transverse vehicle axis as a function of a parallel and substantially identical change in the vertical components generated by the stereo camera oriented in the direction of travel.

4. The device of claim 1, wherein the processor is configured to calculate a temporal change from sampling point to sampling point.

5. The device of claim 4, wherein the processor is configured to calculate at least one of (a) a roll velocity and (b) a roll angle from the temporal change.

6. The device of claim 1, wherein the device is arranged in the vehicle.

7. A device for detecting a rollover of a vehicle, comprising:
    stereo camera means including two image sensing means;
    means for conducting a distance measurement to an object;
    means for generating an image vector for each image sensor;
    processor means connected to the stereo camera means, the processor means for detecting a rollover event from a change in vertical components of the image vectors over time.

* * * * *